(12) United States Patent
Osawa

(10) Patent No.: US 6,895,744 B2
(45) Date of Patent: May 24, 2005

(54) OPERATION METHOD AND OPERATION CONTROL DEVICE OF INTERNAL COMBUSTION ENGINE FOR VEHICLE THAT TEMPORARILY STOPS ENGINE

(75) Inventor: Koichi Osawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/359,585

(22) Filed: Feb. 7, 2003

(65) Prior Publication Data
US 2003/0154952 A1 Aug. 21, 2003

(30) Foreign Application Priority Data
Feb. 20, 2002 (JP) ........................................ 2002-042891

(51) Int. Cl.[7] ............................................... F01N 3/00
(52) U.S. Cl. ........................................... 60/277; 60/274
(58) Field of Search ..................... 123/198 DB; 60/277, 60/274

(56) References Cited

U.S. PATENT DOCUMENTS

| 5,441,122 | A | * | 8/1995 | Yoshida ..................... 180/65.2 |
| 5,492,190 | A | * | 2/1996 | Yoshida ..................... 180/65.4 |
| 6,382,335 | B2 | * | 5/2002 | Takashima et al. ........ 180/65.2 |

FOREIGN PATENT DOCUMENTS

| JP | 60-66838 | 5/1985 |
| JP | A 6-165308 | 6/1994 |
| JP | 2000-97063 | 4/2000 |
| JP | 2000-257497 | 9/2000 |
| JP | A 2001-59444 | 3/2001 |

* cited by examiner

Primary Examiner—Thomas Denion
Assistant Examiner—Zelalem Eshete
(74) Attorney, Agent, or Firm—Oliff & Berridge, PLC

(57) ABSTRACT

In an operation of an internal combustion engine for a vehicle in which an operation of the internal combustion engine is stopped by a control of a vehicle operation control device during a vehicle operation, the control determination includes a determination that the internal combustion engine is not stopped when a temperature of the catalyst is not equal to or less than a predetermined threshold value.

11 Claims, 3 Drawing Sheets

OPERATION METHOD AND OPERATION CONTROL DEVICE OF INTERNAL COMBUSTION ENGINE FOR VEHICLE THAT TEMPORARILY STOPS ENGINE

INCORPORATION BY REFERENCE

The disclosure of Japanese Patent Application No. 2002-42891 filed on Feb. 20, 2002, including the specification, drawings and abstract is incorporated herein by reference in its entirety.

BACKGROUND OF THE INVENTION

1. Field of the Invention

This invention relates to an operation method and an operation control device of an internal combustion engine for a vehicle that temporarily stops an engine, in which an operation of the internal combustion engine is stopped by control determination by a vehicle operation control device during the vehicle operation. More particularly, the invention relates to an improvement of a control of a vehicle operation control device.

2. Description of the Related Art

In recent years, since air environmental conservation has been demanded, an exhaust system of an internal combustion engine for a vehicle such as an automobile is provided with a catalytic converter including an exhaust gas purification catalyst such as three-way catalyst or a lean NOx catalyst which treat HC, CO, and NOx that are generated by an operation of the engine into harmless $H_2O$, $CO_2$, and $N_2$. In order to activate and effectively operate the exhaust gas purification catalyst in the catalytic converter, it is necessary to heat the exhaust gas purification catalyst to a significantly high temperature of approximately 700° C. The high temperature state is achieved by an introduction of high-temperature exhaust gas which is exhausted from the internal combustion engine into the catalytic converter resulting in heat-up of the catalyst and by heat-up of the catalyst due to heat generated by oxidation of unburned components such as HC and CO in catalyst layers.

Moreover, in order to deal with the importance of fuel resource saving as well as the air environmental conservation, an economy running car and a hybrid car have been in the limelight. In a hybrid car, the vehicle is driven by the combination of driving by the internal combustion engine and driving by the motor based on a control determination by the vehicle operation control device based on the vehicle operating state during a vehicle operation. In an economy running car, the internal combustion engine is temporarily stopped by the control determination by the vehicle operation control device while the vehicle is temporarily stopped during the vehicle operation. In addition, with a hybrid car in particular, it is possible to change the control of the internal combustion engine with a considerable degree of freedom, by the combination use of the internal combustion engine and the motor. Focusing on this point, it is proposed in the Japanese Patent Laid-Open Publication 6-165308 that a speed of the internal combustion engine and the load thereof are controlled according to a schedule based on the catalytic converter temperature.

Further, with the development of micro computers in recent years, vehicle operation control devices including a micro computer have been increasingly used for controlling the operation of an internal combustion engine of vehicles. Accompanied by this, a fuel cut, in which fuel supply to the internal combustion engine is cut during an operation like a vehicle deceleration when the internal combustion engine is not required to produce power, has been increasingly used. However, if the fuel cut as above is performed, a large amount of oxygen is flown into the catalytic converter, even if the catalyst in the catalytic converter is in a high-temperature activated state. For this reason, there is a possibility that the catalyst is deteriorated by oxygen. In order to solve this problem, the Japanese Patent Laid-Open Publication 2001-59444 discloses prohibition of the fuel cut when the catalyst temperature is high.

In the mean time, the catalyst in the catalytic converter is heated by the high temperature exhaust gas which is introduced into the catalytic converter from the internal combustion engine as mentioned above. However, there are some cases where the catalyst is cooled by the exhaust gas which passes and flows into the catalytic converter. In other words, the catalyst in the catalytic converter is heated by the exhaust gas while the exhaust gas flow through the catalytic converter is maintained. In addition, if the catalyst temperature becomes too high, the exhaust gas flow has deprived the catalyst of the heat, thus suppressing the increase in the catalyst temperature. The catalyst temperature is maintained at an appropriate temperature under such thermal equilibrium. Therefore, unlike the case where the fuel cut is performed in which the fuel injection into the internal combustion engine is stopped and at least some of the intake air is supplied to the internal combustion engine, when the internal combustion engine is stopped, the exhaust gas flow passing across the catalyst layers is completely stopped. Accordingly, the catalyst is not deprived of the heat by the exhaust gas.

Moreover, all of the heat which is generated by the unburned components which has been already carried into the catalytic converter at the moment when the engine stops stays in the catalytic converter. For this reason, if the internal combustion engine is stopped and the exhaust gas flow which passes the catalytic converter is stopped, the catalyst temperature in the catalytic converter is increased for a while.

In this case, there is no problem if the catalyst temperature during the engine stop does not impair the durability of the catalyst after the temperature is increased by the aforementioned phenomenon. However, if the catalyst temperature during the engine stop exceeds that temperature, the durability of the catalyst may be impaired by the temperature increase. This is a serious issue especially in a hybrid car and an economy running car since they involve frequent stops of the internal combustion engine.

SUMMARY OF THE INVENTION

The invention relates to an improvement of an operation method and an operation control device of an internal combustion engine for a vehicle, more particularly of an international combustion engine for a hybrid car and an economy running car, when the internal combustion engine of a vehicle which is provided with an exhaust gas purification catalytic converter is stopped.

A first aspect of the invention relates to an operation method of an internal combustion engine for a vehicle including the internal combustion engine and an exhaust gas purification catalyst which is provided in a exhaust system of the internal combustion engine. The method includes the steps of determining whether an operation of the internal combustion engine should be stopped during a vehicle operation; detecting a temperature of the catalyst; and determining not to stop the internal combustion engine when the detected temperature of the catalyst is higher than a predetermined threshold value.

In the case of vehicles including a vehicle operation control device which determines to stop the operation of an internal combustion engine in a certain condition, especially in the case of hybrid-vehicles or economy-running vehicles in which such a stop of the internal combustion engine is frequently carried out, a catalyst that is disposed in an exhaust system of the internal combustion engine may be deteriorated when the operation of the internal combustion engine is thus stopped. Such a deterioration of the catalyst, however, can be suppressed, if the vehicle operation control device is arranged not to stop the operation of the internal combustion engine when the temperature of the catalyst is higher than a threshold value as in the first aspect of the invention. By maintaining the operation performance of the catalyst in a good state as mentioned above, even if the internal combustion engine is not stopped during that time period, it is possible to achieve a greater effect with respect to air environmental conservation from a long-term perspective than the case when the engine is stopped.

A second aspect of the invention relates to an operation method of an internal combustion engine for a vehicle including the internal combustion engine and an exhaust gas purification catalyst which is provided in a exhaust system of the internal combustion engine. The method includes the steps of determining whether an operation of the internal combustion engine should be stopped during a vehicle operation; detecting a temperature of the catalyst; and not stopping the internal combustion engine when the detected temperature of the catalyst is higher than a predetermined threshold value, even if it is determined that the operation of the internal combustion engine should be stopped.

A third aspect of the invention relates to an operation device of an internal combustion engine. The devise includes a detector that detects a temperature of a catalyst of an exhaust gas purification catalyst which is provided in a exhaust system of the internal combustion engine, and a controller that determines whether an operation of the internal combustion engine is automatically stopped during a vehicle operation, and that determines not to stop the internal combustion engine when the temperature of the catalyst which is detected by the detector is higher than a predetermined threshold value.

The vehicle in the first to third aspects is not limited to a hybrid car or an economy running car, and may be applied to a vehicle in which the operating state of the vehicle is detected and the internal combustion engine is automatically stopped based on the detected operating state. Here, the phrase "detecting the vehicle operating state of the vehicle and automatically stopping the internal combustion engine based on the detected operating state" does not include "an ordinary stop of an internal combustion engine by the driver's turning off the ignition switch."

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
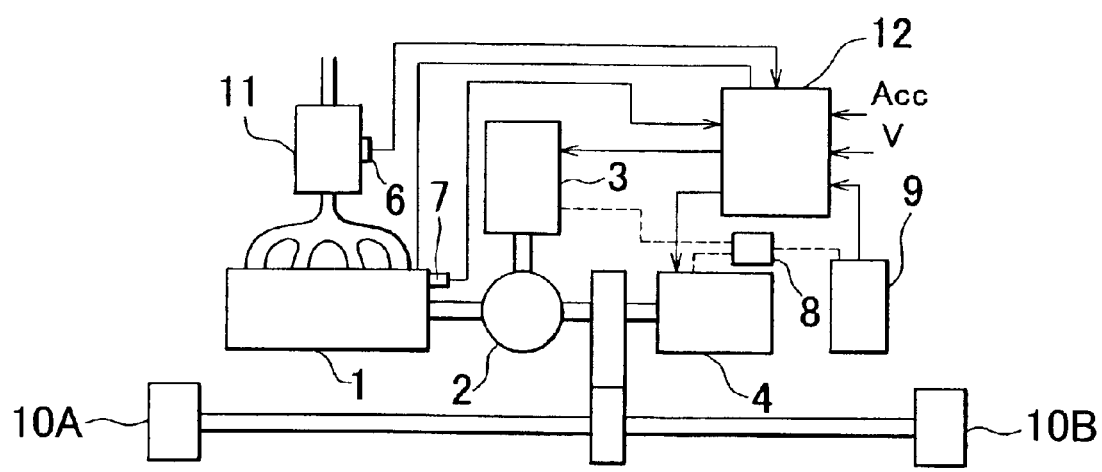
FIG. 1 is a block diagram schematically showing a vehicle according to the first embodiment of the invention.

As shown in FIG. 1, a vehicle according to the first embodiment of the invention is a hybrid car including an internal combustion engine 1 (hereafter referred to as an engine for simplification in the description of the embodiments), an exhaust gas purification catalytic converter 11 which is provided in a exhaust system of the engine 1, a vehicle operation control device 12 (hereafter referred to as a control device for simplification in the description of the embodiments). The control device 12 reads in a signal with respect to a temperature of a catalyst which is detected by a temperature detector 6 that is provided in the catalytic converter 11, a signal with respect to a temperature of the engine 1 which is detected by a temperature detector 7 that is provided with the engine 1, a signal with respect to an accelerator angle Acc from an accelerator angle sensor (not shown), a signal with respect to a vehicle speed V from a vehicle speed sensor (not shown), and a signal with respect to a charge level of a battery 9. In addition, the control device. 12 sends a control signal based on these signals to a generator 3, a motor 4, and the engine 1. The battery 9 is connected to the generator 3 and the motor 4 via an inverter 8. The engine 1 is coupled to the generator 3 and the motor 4 via a driving force splitting and integrating device 2 which is provided with a planetary gearset mechanism such that the driving force can be transferred to one another among the engine 1, the generator 3 and the motor 4. The driving force by the engine 1 and motor 4 is transferred to wheels 10A and 10B.

Figure 2:
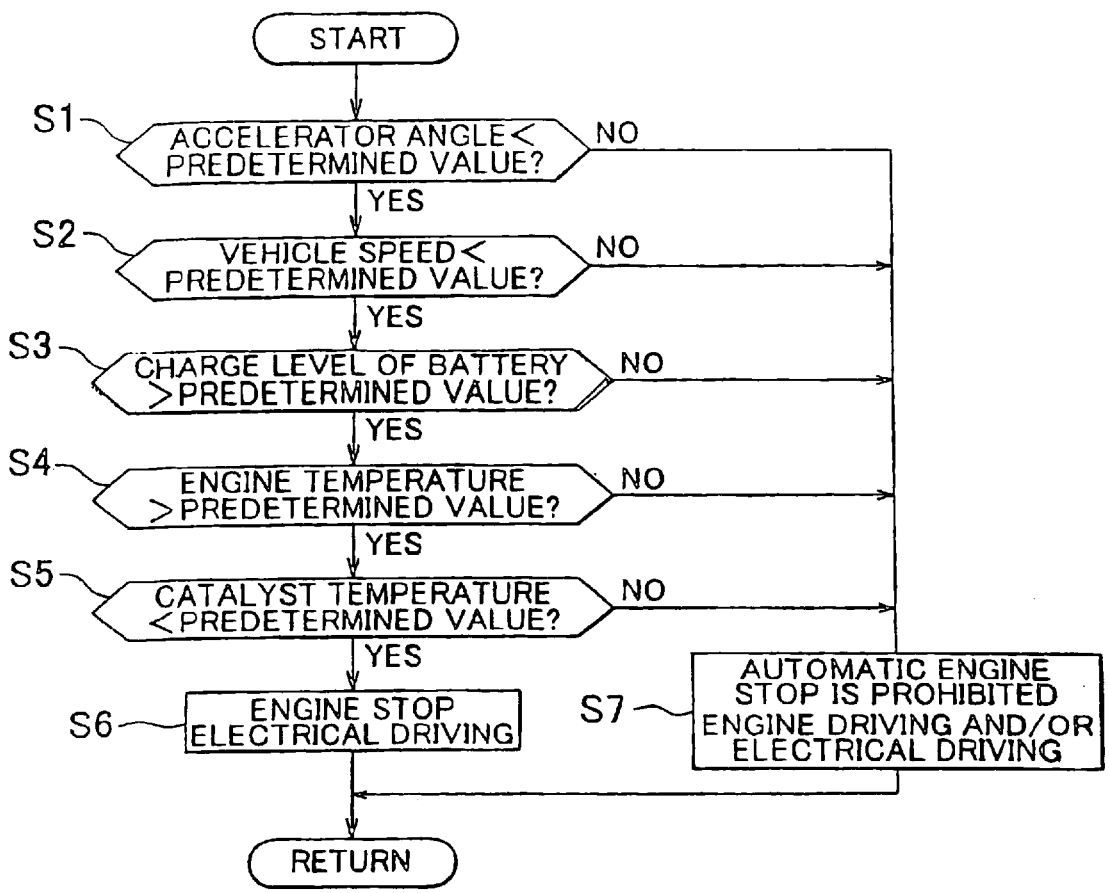
FIG. 2 is a flow chart when an operation method of the internal combustion engine for a vehicle according to the first embodiment is applied to a hybrid car.

FIG. 2 is a flow chart of a control of the engine in a hybrid car. It is a basic operation of a hybrid car that the operation of the engine 1 is stopped by a control determination by a vehicle operation control device (corresponding to the control device 12 of the embodiment) during the vehicle operation. Also, this is a basic configuration of an economy running car. Therefore, the basic operation and the basic configuration are known art, and thus the explanation therefore is omitted so as to avoid redundancy of the specification.

The control according to the flow chart in FIG. 2 is started when the ignition switch (not shown) of a vehicle is closed, then after data which is necessary at each time is read in, and the control starts from step S1. At step S1, it is determined whether the accelerator angle Acc (that is, a depression amount of the accelerator pedal) which is operated by a driver is equal to or less than a predetermined value. This predetermined value is set to a relatively small angle, which is appropriate for the hybrid vehicle to stop the engine and start running by driving the motor 4 only. If the determination at step S1 is positive, the control proceeds to step S2.

At step S2, it is determined whether the vehicle speed V is equal to or less than a predetermined value. The predetermined value with respect to the vehicle speed V is also a relatively small vehicle speed value, which is appropriate for the hybrid vehicle to stop the engine 1 and start running by driving the motor 4 only. If the determination at step S2 is positive, the control proceeds to step S3.

At step S3, it is determined whether the charge level of the battery 9 is equal to or more than a predetermined value. The predetermined value with respect to the charge level shows a state where the battery 9 is charged to the extent in which it is sufficient to perform electrical driving with the engine 1 stopped. If the determination at step S3 is positive, the control proceeds to step S4.

At step S4, it is determined whether the engine temperature is equal to or more than a predetermined value. The predetermined value with respect to the engine temperature is a temperature when the engine 1 achieves warm-up. If the engine 1 is in a state before achieving the temperature, it is desirable that the engine 1 is not stopped. If the determination at step S4 is positive, the control proceeds to step S5.

At step S5, it is determined whether the catalyst temperature is equal to or less than a predetermined value. The predetermined value with respect to the catalyst temperature is an upper limit value of the temperature at which the catalyst is not thermally deteriorated even if the engine 1 is stopped as mentioned above and the catalyst temperature in the catalytic converter 11 is increased for a while immediately after the exhaust gas flow which passes the catalytic converter 11 is stopped. The permissible upper limit value at which the thermal deterioration of the catalyst is prevented is substantially around 800 to 850° C. though depending on a catalyst. The temperature increase for a while which occurs to the catalyst in the catalytic converter 11 immediately after the engine stop is expected to be substantially around 50° C. though depending on an operating state of the engine 1. Therefore, the above mentioned predetermined values are set based on these expected permissible temperature upper limit value and the temperature increase. That is, if the permissible upper limit value is from 800 to 850° C., the above mentioned predetermined value is from 750 to 800° C.

If the determination at step S5 is positive, that is, if all of the determinations from steps S1 to S5 are positive, the control proceeds to step S6. At step S6, the engine 1 is stopped, and in a hybrid car, driving is switched to the electrical driving. While the electrical driving is performed and the engine is stopped, the charge of the battery 9 by the engine 1 is not performed.

Meanwhile, if the determination is negative in any one of steps S1 to S5, the control proceeds from the step at which the negative determination was made to step S7. At step S7, the automatic stop of the engine 1 by the control determination by the control device 12 is prohibited, and the hybrid car does not stop the engine 1. While the hybrid car is running, the hybrid vehicle is driven by one of or both of the engine 1 and the motor 4.

Figure 3:
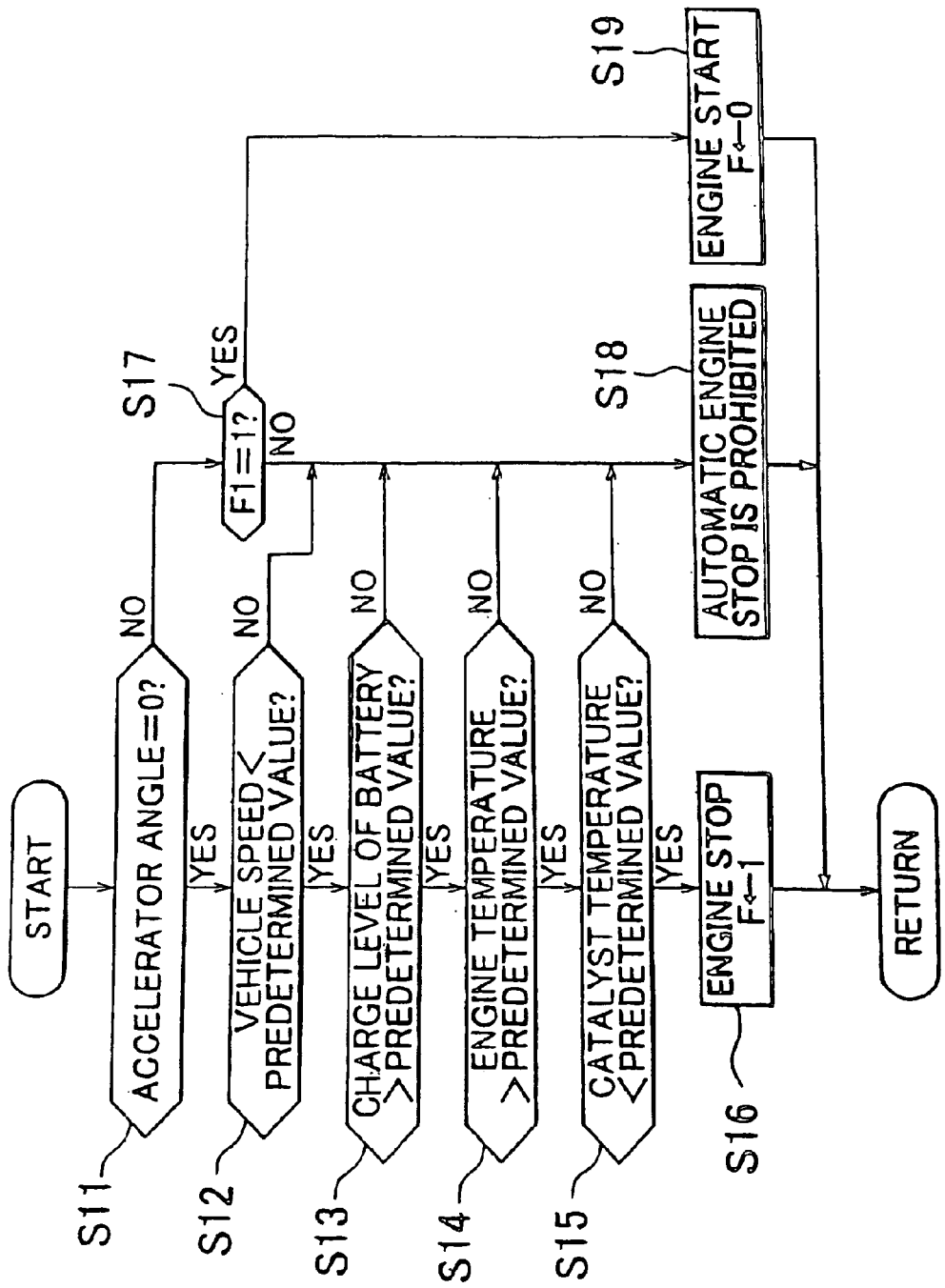
FIG. 3 is a flow chart when an operation method of the internal combustion engine for a vehicle according to the second embodiment is applied to an economy running car.

FIG. 3 is a flow chart of a control of an economy running car according to the second embodiment of the invention. The configuration of an economy running car is the same as that of the ordinary car, in which the catalytic converter is provided with the temperature detector as shown in FIG. 1. In addition, the battery to be installed in the vehicle is a battery for an ordinary vehicle in which the electric power which is necessary for the engine start, or the electric power for driving the auxiliary machine for the vehicle is stored. The control according to the flow chart in FIG. 3 is also started when the ignition switch (not shown) of the vehicle is closed, then after data which is necessary at each time is read in, the control starts from step S1.

First, at step S11, it is determined whether the accelerator angle which is operated by the driver is zero. That is, it is determined whether the driver has an intention to start the vehicle. If the determination at step S11 is positive, the control proceeds to step S12.

At step S12, it is determined whether the vehicle speed is equal to or less than a predetermined value. The predetermined value with respect to the vehicle speed is a vehicle speed which is a boundary as to whether the engine is stopped in an economy running car. An economy running operation stops the engine when the vehicle is temporarily stopped, or when it is determined that the engine stop is permissible also considering other circumstances. The determination with respect to the vehicle speed at step S12 may be the determination whether the vehicle speed is zero. However, it is possible to heighten the effect of an economy running operation further by making the predetermined value into an appropriate minute value other than zero. If the determination at step S12 is positive, the control proceeds to step S13.

At step S13, it is determined whether the charge level of the battery is equal to or more than a predetermined value. The predetermined value with respect to the charge level shows a state where the battery is charged to the extent in which it is sufficient to perform the restart of the engine without any problem even if the engine is stopped. If the determination at step S13 is positive, the control proceeds to step S14.

At step S14, it is determined whether the engine temperature is equal to or more than a predetermined value. The predetermined value with respect to the engine temperature is a temperature when the engine achieves warm-up. If the engine is in a state before achieving the temperature, it is desirable that the temperature is in a range in which the engine is not stopped. If the determination at step S14 is positive, the control proceeds to step S15.

At step S15, it is determined whether the catalyst temperature is equal to or less than a predetermined value. As in the case with the embodiment in FIG. 2, the predetermined value with respect to the catalyst temperature is an upper limit value of the temperature at which the catalyst is not thermally deteriorated even if the engine is stopped and the catalyst temperature in the converter is increased for a while immediately after the exhaust gas flow which passes the catalytic converter is stopped.

If the determination at step S15 is positive, that is, if all of the determinations from steps S11 to S15 are positive, the control proceeds to step S16 and the engine is stopped. Then, a flag F is set to 1.

On the other hand, if the determination at step S11 is negative, the control proceeds to step S17, and it is determined whether the flag F is 1. This type of the flag F is reset to 0 on the control start. Therefore, the flag F is 0 in a state where the engine is not stopped at step S16, and the flag F is 1 in a state where the engine is stopped at step S16. If the determination at step S17 is negative, that is, when the engine has not been temporarily stopped yet, and the depression of the accelerator pedal has not been released yet or when the determination in any one of steps S12 to S15 is negative, the control proceeds to step S18. Then the automatic stop of the engine by the control determination by the vehicle operation control device (corresponding to the control device 12 in FIG. 1) is prohibited.

After the control proceeds to step S16 and the engine is stopped, when the determination at step S11 is changed from positive to negative due to the depression of the accelerator pedal of the driver, the control proceeds to step S17 where the determination at step S17 becomes positive. Then the control proceeds to step S19, and the engine is restarted by the starter. Also, the flag F is reset to 0 then.

While two embodiments of the invention have been explained in detail, it is obvious to a person skilled in the art that various modifications are possible for the embodiments herein without departing from the true spirit of the invention.

What is claimed is:

1. An operation method of an internal combustion engine for a vehicle including the internal combustion engine and an exhaust gas purification catalyst which is provided in a exhaust system of the internal combustion engine, comprising:

determining whether an operation of the internal combustion engine should be stopped during a vehicle operation;

detecting a temperature of the catalyst; and determining not to stop the internal combustion engine when the detected temperature of the catalyst is higher than a predetermined threshold value, wherein the predetermined threshold value is lower than a permissible upper limit value, at which a thermal deterioration of the catalyst is prevented, by at least an increase amount of the catalyst temperature immediately after the stop of the internal combustion engine.

2. The method according to claim 1, further comprising:

detecting an operating state of the vehicle; and automatically stopping the internal combustion engine based on the detected operating state.

3. The method according to claim 1, wherein the method is an operation method of an internal combustion engine for a hybrid car which is capable of using both driving force by the internal combustion engine and driving force by a motor as driving force.

4. The method according to claim 3, wherein when the internal combustion engine is stopped by the control determination, the hybrid car is operated by the driving force by the motor.

5. The method according to claim 1, wherein the method is an operation method of an internal combustion engine for an economy running car in which the internal combustion engine is temporarily stopped as necessary during a temporary stop of the vehicle.

6. The method according to claim 5, further comprising:

assuming whether a driver has the intention to start the economy running car after the temporary stop, and wherein if it is assumed that the driver has the intention to start the economy running car, the internal combustion engine is restarted.

7. An operation method of an internal combustion engine for a vehicle including the internal combustion engine and an exhaust gas purification catalyst which is provided in a exhaust system of the internal combustion engine, comprising:

determining whether an operation of the internal combustion engine should be stopped during a vehicle operation;

detecting a temperature of the catalyst; and not stopping the internal combustion engine when the detected temperature of the catalyst is higher than a predetermined threshold value, even if it is determined that the operation of the internal combustion engine should be stopped, wherein the predetermined threshold value is lower than a permissible upper limit value, at which a thermal deterioration of the catalyst is prevented, by at least an increase amount of the catalyst temperature immediately after the stop of the internal combustion engine.

8. An operation device of an internal combustion engine of a vehicle, comprising:

a detector that detects a temperature of a catalyst of an exhaust gas purification catalyst which is provided in a exhaust system of the internal combustion engine, and a controller that determines whether an operation of the internal combustion engine is automatically stopped during a vehicle operation, and that determines not to stop the internal combustion engine when the temperature of the catalyst which is detected by the detector is higher than a predetermined threshold value, wherein the predetermined threshold value is lower than a permissible upper limit value, at which a thermal deterioration of the catalyst is prevented, by at least an increase amount of the catalyst temperature immediately after the stop of the internal combustion engine.

9. The device according to claim 8, further comprising:

a detector that detects an operating state of the vehicle; and wherein the controller automatically stops the internal combustion engine based on the operating state detected by the detector.

10. The device according to claim 8, wherein the vehicle is a hybrid car which is capable of using both driving force by the internal combustion engine and driving force by a motor as driving force, and when the internal combustion engine is stopped, the controller operates the hybrid car by the driving force by the motor.

11. The device according to claim 8, wherein the vehicle is an economy running car in which the internal combustion engine is temporarily stopped as necessary during a temporary stop of the vehicle, the controller assumes whether a driver has an intention to start the economy running car after the temporary stop, and if it is assumed that the driver has the intention to start the economy running car, the controller restarts the internal combustion engine.

* * * * *